United States Patent
Koyama et al.

(10) Patent No.: US 6,306,786 B1
(45) Date of Patent: *Oct. 23, 2001

(54) GLASS COMPOSITION AND PROCESS FOR PRODUCING THE SAME

(75) Inventors: Akihiro Koyama; Shoichi Kishimoto; Junji Kurachi; Nobuyuki Yamamoto, all of Osaka (JP)

(73) Assignee: Nippon Sheet Glass Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,991

(22) Filed: Apr. 19, 1999

(30) Foreign Application Priority Data

Apr. 17, 1998 (JP) ................................................. 10-124308

(51) Int. Cl.$^7$ ........................... C03C 3/062; C03C 3/085; C03C 3/087; B32B 17/00
(52) U.S. Cl. ................................ 501/69; 501/70; 501/72; 501/73; 428/64.2; 428/65.4; 428/65.6; 428/410; 428/689
(58) Field of Search .................................. 501/69, 70, 72, 501/73; 428/432, 689, 701, 64.1, 64.2, 64.3, 65.3, 65.6, 426, 410, 694 ST

(56) References Cited

U.S. PATENT DOCUMENTS

| | | | |
|---|---|---|---|
| 3,117,881 | * | 1/1964 | Henry et al. . |
| 5,281,562 | * | 1/1994 | Araujo et al. ............................ 501/65 |
| 5,561,089 | * | 10/1996 | Ishizaki et al. ......................... 501/70 |
| 5,599,754 | * | 2/1997 | Maeda et al. ........................... 501/70 |
| 5,726,108 | * | 3/1998 | Taguchi et al. ........................... 501/5 |
| 5,804,520 | * | 9/1998 | Morinaga et al. ....................... 501/4 |
| 5,858,897 | * | 1/1999 | Maeda et al. ........................... 501/70 |
| 5,895,768 | * | 4/1999 | Speit ...................................... 501/69 |
| 5,900,296 | * | 5/1999 | Hayashi et al. ......................... 501/70 |
| 5,908,794 | * | 6/1999 | Maeda et al. ........................... 501/70 |
| 5,997,977 | * | 12/1999 | Zou et al. . |

FOREIGN PATENT DOCUMENTS

| 63-210039 | * | 8/1988 | (JP) . |
|---|---|---|---|
| 3-040933 | * | 2/1991 | (JP) . |
| 8-321034 | | 12/1996 | (JP) . |
| 10-59741 | | 3/1998 | (JP) . |

* cited by examiner

Primary Examiner—David R Sample
(74) Attorney, Agent, or Firm—Sughrue, Mion, Zinn, Macpeak & Seas, PLLC

(57) ABSTRACT

A glass composition is disclosed which has a high modulus elasticity (Young's modulus) and a high rigidity (modulus of elasticity/specific gravity) and is capable of being effectively inhibited from bending or vibrating. Also disclosed is a process for producing the glass composition. The glass composition comprises, in terms of mol %, 40 to 65% $SiO_2$, 5 to 25% $Al_2O_3$, 2 to 20% $Li_2O$, 0 to 9% $Na_2O$, 0 to 10% $TiO_2$, 0 to 10% $ZrO_2$, 0 to 25% MgO, 0 to 25% CaO, and 0 to 10% SrO, provided that the content of RO (RO=MgO+CaO+SrO) is from 2 to 40% and the sum of ($Li_2O$)/2 and $Na_2O$ is from 1 to 10 mol %, said glass composition further containing, as clarifiers, from 0.01 to 5 mol % $SnO_2$ and up to 0.1 mol % sulfur (S) in terms of the amount of $SO_3$.

3 Claims, No Drawings

GLASS COMPOSITION AND PROCESS FOR PRODUCING THE SAME

FIELD OF THE INVENTION

The present invention relates to a glass composition having a high rigidity and a high modulus and a process for producing the same. More particularly, this invention relates to a glass composition suitable for use as a substrate for information recording media which is required to be of high quality and have excellent surface smoothness and a high modulus of elasticity, and to a process for producing the glass composition. The present invention further relates to a substrate for information recording media and an information recording medium both comprising the glass composition.

BACKGROUND OF THE INVENTION

Information recording devices such as magnetic disks are always required to have a larger recording capacity and to attain a reduction in access time such as disk rotational delay. One possible means for satisfying the latter requirement is to heighten the rotational speed of a medium.

However, the substrates or media currently in use are weighed down by themselves and resonate considerably at an increased rotational speed. Eventually, the surface of such a medium comes into contact with the head to cause an error or crushing. It is therefore impossible to narrow the gap between the magnetic disk head and the recording medium to or below a certain level, and this constitutes a serious obstacle to an increase in recording capacity.

For reducing the bending of a substrate or medium and diminishing the resonance of the medium being rotated, it is necessary to heighten both the modulus of elasticity (Young's modulus) of the substrate and the rigidity thereof which is the value obtained by dividing the modulus of elasticity by the specificgravity. However, the aluminum alloy which has been most commonly used as the substrates of magnetic disks has a modulus of elasticity of 71 GPa and a rigidity of 26 GPa·cm$^3$/g. This conventional substrate material, having such properties, hardly copes with the trend toward higher rotational speeds of 10,000 rpm and above. In addition, it has become necessary to increase the thickness of substrates made of the above material, although this goes against the current trend toward thickness reduction in disk substrates for device miniaturization.

In contrast, substrates made of a chemically strengthened glass are superior to the aluminum substrate in both modulus of elasticity and specific gravity.

For example, a glass substrate obtained by subjecting a commercial soda-lime glass to ion exchange in a molten potassium salt is on the market. This substrate has a modulus of elasticity of 72 GPa and a rigidity of 29 GPa·cm$^3$/g.

Also known besides the above one is a glass substrate obtained by chemically strengthening commercial Corning 0317. Although this substrate has a modulus of elasticity of 72 GPa and a rigidity of 29 GPa·cm$^3$/g, these properties are still insufficient.

High-rigidity substrates for information recording media which are made of a material other than chemically strengthened glasses are on the market. These substrates comprise a crystallized glass having a modulus of elasticity of 90 GPa nd a rigidity of 38 GPa·cm$^3$/g. However, these substrates, after polishing, inevitably have residual crystal grains projecting from the surface because of the nature of the production process in which crystals are precipitated inside.

Namely, these crystallized-glass substrates have a drawback that they are inferior in surface smoothness to the substrates made of a chemically strengthened glass.

Consequently, in view of the expected future trend toward even higher rotational speeds in information recording devices, there is a desire for a glass composition which has further improved properties, i.e., which has a high Young's modulus and a high rigidity, can be easily strengthened chemically, and gives a substrate having high surface smoothness through polishing.

SUMMARY OF THE INVENTION

One object of the present invention is to provide a glass composition which has a high value of modulus of elasticity represented by Young's modulus and a high value of rigidity defined by (Young's modulus)/(specific gravity) and is capable of being effectively inhibited from resonantly vibrating or reduced in the amplitude of resonant vibration.

Another object of the present invention is to provide a glass substrate for information recording media which comprises the glass composition.

Still another object of the present invention is to improve glass quality by diminishing bubbling during glass article production.

The present invention has been achieved in view of the above-described problems of prior art techniques and the above-described requirements.

The present invention provides a glass composition comprising the following basic components in terms of mol %: 40 to 65% SiO$_2$, 5 to 25% Al$_2$O$_3$, 2 to 20% Li$_2$O, 0 to 9% Na$_2$O, 0 to 10% TiO$_2$, 0 to 10% ZrO$_2$, 0 to 25% MgO, 0 to 25% CaO, and 0 to 10% SrO, provided that the content of RO (RO=MgO+CaO+SrO) is from 2 to 40% and the sum of (Li$_2$O)/2 and Na$_2$O is from 1 to 10 mol %, said glass composition further containing from 0.01 to 5 mol % SnO$_2$ and up to 0.1 mol % sulfur (S) in terms of the amount of SO$_3$.

The glass composition preferably has a rigidity as defined by (Young's modulus)/(specific gravity) of 30 GPa·g$^{-1}$·cm$^3$ or higher and a modulus of elasticity as represented by Young's modulus of 90 GPa or higher.

Furthermore, the glass composition is preferably one which has undergone an ion exchange treatment in at least one molten salt containing ions of potassium, sodium, or both.

The present invention further provides a process for producing a glass composition comprising the following basic components in terms of mol %: 40 to 65% SiO$_2$, 5 to 25% Al$_2$O$_3$, 2 to 20% Li$_2$O, 0 to 9% Na$_2$O, 0 to 10% TiO$_2$, 0 to 10% ZrO$_2$, 0 to 25% MgO, 0 to 25% CaO, and 0 to 10% SrO, provided that the content of RO (RO=MgO+CaO+SrO) is from 2 to 40%, wherein SnO$_2$ and sulfur are further added to the composition, so that the glass composition further contains, as clarifiers, from 0.01 to 5 mol % SnO$_2$ and up to 0.1 mol % sulfur (S) in terms of the amount of SO$_3$ when the sum of (Li$_2$O)/2 and Na$_2$O is from 1 to 10 mol %.

In the process for producing a glass composition, a sulfuric acid salt compound is preferably used as part of batch materials for the composition.

Furthermore, in the process for producing a glass composition, the glass composition is preferably molded by a float process.

The present invention still further provides a substrate for information recording media which comprises the above-described glass composition which has undergone the ion exchange treatment. An information recording medium containing the substrate is also provided by the invention.

The present inventors made intensive investigations on glass compositions having a high Young's modulus. As a result, they have found that it is necessary to limit the contents of $Na_2O$ and $K_2O$, which are alkali metal oxides, to or below certain levels. In particular, since $K_2O$ is highly effective in lowering Young's modulus, the content thereof is preferably not higher than 0.1 mol %, which is an allowable limit of the amount of $K_2O$ which can come into a glass as an impurity. More preferably, the content of $K_2O$ is substantially zero.

$Na_2O$ is the most effective after $K_2O$ in lowering Young's modulus. The content thereof is hence preferably 9 mol % or lower, more preferably 5 mol % or lower.

In producing soda-lime glass compositions to be generally molded by a float process, a sulfuric acid salt compound, especially $Na_2SO_4$, is used as a clarifier. The $Na_2SO_4$ decomposes in the course of glass melting, and part of the sulfur dissolves as $SO_2$, $SO_3$, and other forms in the glass. The dissolved sulfur ingredients absorb bubbles in the course of glass cooling, whereby a bubble-free glass of high quality can be produced.

It has however been found that glasses having a low content of alkali metal oxides, especially $Na_2O$ and $Li_2O$, have a reduced content of residual sulfur.

The inventors have further found that when the residual sulfur content in a glass is expressed in terms of the amount of $SO_3$, this amount correlates with the content of $Li_2O$ and $Na_2O$ in the glass, i.e., with $(Li_2O)/2+Na_2O$ (mol %). For example, soda-lime glasses in which the amount of $(Li_2O)/2+Na_2O$ has been reduced to 10 mol % or 5 mol % have an amount of residual $SO_3$ about one-half or about one-fifth, respectively, the amount of residual $SO_3$ in ordinary soda-lime glasses.

There has hence been a problem that in glasses having a low residual $SO_3$ content, a sufficient clarifying effect cannot be obtained with $Na_2SO_4$, which is an ordinary clarifier.

The present inventors furthermore made investigations on a method for glass composition clarification applicable also to a float process, which is a molding technique capable of producing especially highly flat glass plates.

As a result of intensive studies made by the present inventors in order to eliminate the above-described problem, they have found that a sufficient clarifying effect is obtained in a glass in which the amount of $(Li_2O)/2+Na_2O$ is 10 mol % or smaller and which contains $SnO_2$ in an amount of from 0.01 to 5 mol %. The presence of $SnO_2$ is effective especially in a glass in which the amount of $(Li_2O)/2+Na_2O$ is 5 mol % or smaller.

Usable materials for the $SnO_2$ include $SnO_2$, $SnO$, and other tin compounds.

It has also been found that the above clarifying effect is further enhanced by using a sulfuric acid salt compound as one of the batch materials for the above glass. The present invention has been thus achieved.

DETAILED DESCRIPTION OF THE INVENTION

Examples of the sulfuric acid salt used as a batch material include $Li_2SO_4$, $Na_2SO_4$, $MgSO_4$, $CaSO_4$, $SrSO_4$, and $BaSO_4$. Especially preferred of these are $Li_2SO_4$ and $Na_2SO_4$. If the sulfur content in the batch materials is too low, the clarifying effect thereof is insufficient. Even if the content thereof is too high, the clarifying effect thereof is not heightened anymore and the result is increased emission of SOX gases causative of air pollution. Consequently, the sulfuric acid salt as a batch material is used in an amount of generally from 0.1 to 10%, preferably from 0.2 to 2%, in terms of sulfur amount based on the $SiO_2$ (mol %) contained in the glass to be produced. When the sulfuric acid salt is used in a proportion within the above range, the glass obtained has a residual sulfur content of from 0 to 0.1 mol %.

Although $As_2O_3$, $Sb_2O_3$, and compounds thereof have hitherto been generally employed as clarifiers, these compounds are undesirable because of their toxicity. In the case of using a float process, use of $As_2O_3$ or $Sb_2O_3$ is more undesirable in that it is reduced by tin metal to generate defects on the glass surface.

The reasons for limitations of the makeup of the glass composition are as follows. Hereinafter, all percents are by mole.

$SiO_2$ is the main component constituting the glass. If the proportion of $SiO_2$ is lower than 40%, the glass has impaired chemical durability. On the other hand, if the proportion thereof exceeds 64%, the desired modulus of elasticity and rigidity are not obtained. Consequently, the proportion of $SiO_2$ should be from 40 to 65%.

$Al_2O_3$ is an ingredient which improves the rigidity of the glass and increases the depth of a compression stress layer formed by ion exchange. $Al_2O_3$ further serves to improve the water resistance of the glass. If the proportion of $Al_2O_3$ is lower than 5%, these effects are insufficient. On the other hand, if the proportion thereof exceeds 25%, the results are an increased viscosity, an increase in liquidus temperature which is severer than the viscosity increase, and impaired meltability. Consequently, the proportion of $Al_2O_3$ should be from 5 to 25%, and is preferably from 10 to 20%.

$Li_2O$, which is an ingredient to be replaced in ion exchange, serves to lower the melting temperature of the glass to thereby enhance its meltability. If the proportion of $Li_2O$ is lower than 2%, ion exchange cannot be conducted and the glass has too high a melting temperature. On the other hand, if the proportion thereof exceeds 20%, the substrate has impaired weatherability and impaired acid resistance. Consequently, the proportion of $Li_2O$ should be from 2 to 20%, and is preferably from 2 to 15%.

$Na_2O$, which is an ingredient to be replaced in ion exchange, serves to lower the melting temperature and the liquidus temperature to thereby enhance meltability. If the proportion of $Na_2O$ exceeds 9%, the glass has a reduced modulus of elasticity and impaired weatherability and acid resistance. Consequently, the proportion of $Na_2O$ should be 9% or lower, and is preferably 5% or lower.

$TiO_2$ is an ingredient which improves the modulus of elasticity and weatherability of the glass. However, if the proportion thereof exceeds 10%, the glass has an elevated liquidus temperature and impaired devitrification resistance. Consequently, the proportion of $TiO_2$ should be 10% or lower.

$ZrO_2$ is an ingredient which improves the modulus of elasticity and weatherability of the glass. However, if the proportion of $ZrO_2$ exceeds 10%, the glass has an elevated liquidus temperature and impaired devitrification resistance. Consequently, the proportion of $ZrO_2$ should be 10% or lower.

MgO is an ingredient which heightens the modulus of elasticity and meltability of the glass. However, if the proportion of MgO exceeds 25%, the glass has an elevated liquidus temperature and impaired devitrification resistance. Consequently, the proportion of MgO should be 25% or lower.

CaO is an ingredient which heightens the modulus of elasticity and meltability of the glass. However, if the proportion of CaO exceeds 25%, the glass has an elevated liquidus temperature and impaired devitrification resistance. Consequently, the proportion of CaO is preferably 25% or lower.

SrO is an ingredient which enhances the meltability of the glass. However, if the glass contains SrO in a large amount, it disadvantageously has an increased specific gravity and a reduced rigidity. Consequently, the proportion of SrO is preferably 10% or lower.

If the total amount of MgO, CaO, and SrO (i.e., the amount of RO) is below 2%, the glass has a low modulus of elasticity and insufficient meltability. If the total amount thereof exceeds 40%, the glass has an elevated liquidus temperature and impaired devitrification resistance. Consequently, the total amount of RO is preferably from 2 to 40%.

$SnO_2$ is an ingredient which not only improves the modulus of elasticity and weatherability of the glass, but also serves as an effective clarifier. If the proportion of $SnO_2$ is lower than 0.01%, sufficient effects cannot be obtained. On the other hand, proportions thereof exceeding 5% are undesirable in that devitrification occurs to generate $SnO_2$ crystals. Consequently, the proportion of $SnO_2$ is generally from 0.01 to 5%, preferably from 0.1 to 2%.

Besides the ingredients described above, other ingredients may be added in a total amount of up to 3%. Examples of such optional ingredients include $Fe_2O_3$, CoO, NiO, and MnO for coloring, and further include ZnO, $Y_2O_3$, $La_2O_3$, and $CeO_2$.

This glass, which contains $Li_2O$ or contains $Li_2O$ and $Na_2O$, can be made to have an increased fracture strength by immersing the glass in at least one molten salt containing ions of potassium and sodium or of either at a temperature not higher than the distortion point of the glass to thereby interchange these ions and thus generate a compression stress on the surface of the glass.

When this glass composition is used as a substrate for information recording media, this substrate is less apt to bend or suffer resonant vibration because it has a high rigidity. Therefore, the recording medium employing this glass composition is especially suitable for use in recording apparatuses of the high rotational speed type.

Since the glass composition described above contains not $As_2O_3$ nor $Sb_2O_3$, which are toxic, but $SnO_2$ as a clarifier, it is excellent in quality with respect to freedom from bubbles. The glass composition is preferred also in that due to the nonuse of $As_2O_3$ or $Sb_2O_3$, it develops no surface defects even when molded by a float process.

The present invention will be explained below in more detail by reference to Examples. However, the invention should not be construed as being limited to these Examples.

EXAMPLES 1 TO 10

Ten compositions as examples of the glass composition of the present invention are shown in Table 1 together with properties thereof.

TABLE 1

| | Example | | | | | | |
|---|---|---|---|---|---|---|---|
| | 1 | 2 | 3 | 4 | 5 | 6 | 7 |
| Component (mol %) | | | | | | | |
| $SiO_2$ | 41.9 | 47.0 | 62.6 | 63.0 | 54.9 | 45.4 | 45.0 |
| $Al_2O_3$ | 9.5 | 12.0 | 10.3 | 10.0 | 10.0 | 15.0 | 20.0 |
| $Li_2O$ | 16.7 | 3.0 | 19.0 | 19.0 | 5.0 | 10.0 | 2.0 |
| $Na_2O$ | 0.0 | 0.0 | 0.0 | 0.0 | 7.0 | 4.0 | 8.0 |
| $K_2O$ | 0.0 | 0.0 | 0.0 | 0.0 | 0.0 | 0.0 | 0.0 |
| MgO | 12.5 | 12.0 | 2.5 | 2.5 | 0.0 | 20.0 | 19.8 |
| CaO | 18.3 | 22.0 | 4.5 | 4.5 | 5.0 | 0.0 | 4.0 |
| SrO | 0.0 | 0.0 | 0.0 | 0.0 | 10.0 | 0.0 | 1.0 |
| $ZrO_2$ | 0.0 | 3.0 | 0.0 | 0.0 | 5.0 | 0.0 | 0.0 |
| $TiO_2$ | 0.0 | 0.0 | 0.0 | 0.0 | 0.0 | 5.0 | 0.0 |
| $SnO_2$ | 1.0 | 1.0 | 1.0 | 1.0 | 3.0 | 0.5 | 0.1 |
| $SO_3$ | 0.058 | 0.004 | 0.081 | 0.000 | 0.085 | 0.063 | 0.069 |
| $As_2O_3$ | 0.0 | 0.0 | 0.0 | 0.0 | 0.0 | 0.0 | 0.0 |
| Total | 100.0 | 100.0 | 100.0 | 100.0 | 100.0 | 100.0 | 100.0 |
| Sulfate Material (%/$SiO_2$) | | | | | | | |
| $Li_2SO_4$ | 1.0 | 1.0 | 1.0 | | | | |
| $Na_2SO_4$ | | | | | 2.0 | 0.5 | 0.2 |
| Number of bubbles (per 100 g) | 0.0 | 0.0 | 0.6 | 9.0 | 0.0 | 0.0 | 0.3 |
| Specific gravity (g/cm³) | 2.77 | 2.86 | 2.45 | 2.45 | 2.76 | 2.95 | 2.73 |
| Modulus of elasticity (Gpa) | 108 | 104 | 90 | 90 | 92 | 107 | 91 |
| Rigidity (GPa.cm³/g) | 39 | 36 | 37 | 37 | 33 | 36 | 33 |

| | Example | | | Comparative Example | | | |
|---|---|---|---|---|---|---|---|
| | 8 | 9 | 10 | 1 | 2 | 3 | 4 |
| Component (mol %) | | | | | | | |
| $SiO_2$ | 50.1 | 50.1 | 54.9 | 63.0 | 58.2 | 71.4 | 67.0 |
| $Al_2O_3$ | 15.0 | 15.0 | 15.6 | 11.0 | 15.6 | 0.9 | 10.4 |
| $Li_2O$ | 5.0 | 5.0 | 10.8 | 19.0 | 10.8 | 0.0 | 0.0 |
| $Na_2O$ | 0.0 | 0.0 | 4.2 | 0.0 | 4.2 | 12.7 | 13.0 |
| $K_2O$ | 0.0 | 0.0 | 0.0 | 0.0 | 0.1 | 0.5 | 2.3 |
| MgO | 17.9 | 17.9 | 3.0 | 2.5 | 3.0 | 6.0 | 5.2 |
| CaO | 5.0 | 5.0 | 4.5 | 4.5 | 4.5 | 8.4 | 0.5 |
| SrO | 0.0 | 0.0 | 3.0 | 0.0 | 3.0 | 0.0 | 0.0 |
| $ZrO_2$ | 5.0 | 5.0 | 0.0 | 0.0 | 0.0 | 0.0 | 0.0 |
| $TiO_2$ | 0.0 | 0.0 | 0.9 | 0.0 | 0.6 | 0.0 | 0.6 |
| $SnO_2$ | 2.0 | 2.0 | 3.0 | 0.0 | 0.0 | 0.0 | 0.0 |
| $SO_3$ | 0.005 | 0.000 | 0.082 | 0.000 | 0.000 | 0.170 | 0.000 |
| $As_2O_3$ | 0.0 | 0.0 | 0.0 | 0.0 | 0.0 | 0.0 | 1.2 |
| Total | 100.0 | 100.0 | 100.0 | 100.0 | 100.0 | 100.0 | 100.0 |
| Sulfate Material (%/$SiO_2$) | | | | | | | |
| $Li_2SO_4$ | 4.0 | | | | | | |
| $Na_2SO_4$ | | 1.0 | | | 1.0 | | |
| Number of bubbles (per 100 g) | 0.9 | 7.9 | 0.0 | 68.9 | 235.0 | 0.0 | 12.0 |
| Specific gravity (g/cm³) | 2.93 | 2.93 | 2.58 | 2.45 | 2.58 | 2.50 | 2.46 |
| Modulus of elasticity (Gpa) | 106 | 106 | 91 | 90 | 91 | 72 | 72 |
| Rigidity (GPa.cm³/g) | 36 | 36 | 35 | 37 | 35 | 29 | 29 |

An explanation is first given on the Examples. Common raw materials for glass including silica, alumina, lithium carbonate, lithium sulfate, sodium carbonate, sodium sulfate, basic magnesium carbonate, calcium carbonate, potassium carbonate, strontium carbonate, barium carbonate, titania, zirconia, and tin oxide were mixed together to prepare batches as base materials for substrate glasses so that these batches gave compositions respectively having the components shown in Table 1 and each weighing 400 g.

The batch material used as a sulfur source in each batch is shown in Table 1 together with the amount of sulfur contained in the batch in terms of the amount of $SO_3$ (%) based on $SiO_2$.

Each batch prepared was held at 1,500° C. for 4 hours with a platinum crucible and then poured on an iron plate, provided that in Comparative Example 4, the batch was held at 1,600° C. for 16 hours. This glass was held at 650° C. for 30 minutes in an electric furnace. Thereafter, the furnace was switched off to allow the glass to cool to room temperature. Thus, sample glasses were obtained.

The number of bubbles, specific gravity, modulus of elasticity (Young's modulus), rigidity (Young's modulus/ specific gravity), and compression stress layer thickness of each of the sample glasses were counted, measured, or calculated in the following manners.

The number of bubbles in each sample glass was visually counted with edge-lighting. The results obtained are shown in Table 1.

In each of the glasses of the Examples, the number of bubbles was not larger than 10 per 100 g of the glass. In particular, in each of the glasses for which a sulfuric acid salt had been used as a batch material, the number of bubbles was not larger than 1 per 100 g of the glass.

A bubble-free part of each sample glass was cut into a piece and each side thereof was subjected to mirror polishing to obtain a platy sample having dimensions of 5×30×30 mm. Each sample was examined for density by the Archimedes method. Furthermore, the Young's modulus of each sample was calculated by the ultrasonic method using a sing-around oscillator.

The glasses of Examples 1 to 10 according to the present invention each had a rigidity as defined by (Young's modulus)/(specific gravity) exceeding 30 GPa·g$^{-1}$·cm$^3$ and a modulus of elasticity exceeding 90 GPa in terms of Young's modulus. These results are shown in Table 1.

Subsequently, glass samples were prepared from the sample glasses of Examples 1 to 10 in the same manner as in the determination of Young's modulus. These samples were immersed for 1 hour in a melt of an 80:20 by weight salt mixture of KNO$_3$ and NaNO$_3$ heated at 380° C. to conduct chemical strengthening. Thereafter, each strengthened glass was examined with a polarizing microscope to determine the thickness of the resultant compression stress layer.

In each of the sample glasses of Examples 1 to 10, a compression stress layer having a thickness of 50 µm or larger had been formed. The components of these glasses thus proved to be suitable for chemical strengthening.

Application Example

The sample glass of Example 1 described above was cut into a ring form having an outer diameter of 95 mm and an inner diameter of 20 mm. This disk was ground and polished and subsequently subjected to chemical strengthening under the same conditions as the above and then to mirror polishing (surface roughness R$_a$: ≦1 nm; JIS B 0601-1994) to regulate the thickness thereof to 1.0 mm. Thus, a substrate for magnetic recording media was obtained.

Using the thus-produced substrate for magnetic recording media, a magnetic disk medium was produced in the following manner.

Chromium, Co—Cr—Ta, and carbon were deposited on the substrate as an undercoat layer, recording layer, and protective layer, respectively, by sputtering. A lubricating layer was further formed thereon to obtain a magnetic disk medium. The medium thus obtained was set in a closed type magnetic-disk drive and continuously rotated at each of 10,000 rpm and 12,000 rpm. In either case, the medium was found to be free from troubles such as head crushing caused by substrate vibration, because the glass substrate had a high Young's modulus and a high rigidity.

Comparative Examples 1 to 4

An explanation is given below on Comparative Examples 1 to 4. The compositions of Comparative Examples 1 to 4 are outside the scope of the present invention. Sample glasses were prepared in the same manner as in the Examples, except that in Comparative Example 4, the batch was held at 1,600° C. for 16 hours.

The glass compositions of Comparative Examples 1 to 4 each contained no SnO$_2$ as a clarifier. A sulfuric acid salt was used only in Comparative Example 3. As$_2$O$_3$ as a clarifier was used only in Comparative Example 4.

The number of bubbles, specific gravity, modulus of elasticity (Young's modulus), rigidity (Young's modulus/ specific gravity), and compression stress layer thickness of each of these sample glasses were counted, measured, or calculated in the same manners as in the Examples. The results obtained are shown in Table 1.

In each of the sample glasses of Comparative Examples 1 and 2,which contained no SnO$_2$ as a clarifier, the number of bubbles was larger than 50 per 100 g of the glass, which was far larger than the numbers of bubbles of 10 or smaller in the Examples.

With respect to modulus of elasticity (Young's modulus) and rigidity (Young's modulus/specific gravity), the glasses of Comparative Examples 3 and 4 each had a Young's modulus lower than 90 GPa and a rigidity lower than 30 GPa·g$^{-1}$·cm$^3$. These found values were as small as about 80% of the corresponding values in the Examples.

The sample glass of Comparative Example 3 only was subjected to the same chemical strengthening as in the Examples, and the thickness of the resulting compression stress layer was measured. However, the compression stress layer formed on the sample glass of Comparative Example 3 had a thickness as small as 10 µm.

As described above in detail, the following effects are brought about by the present invention.

According to one embodiment of the invention, a glass composition having a higher rigidity and a higher modulus of elasticity than conventional glasses can be obtained.

According to the preferred embodiment of the invention, a limited high-rigidity high-modulus glass composition is provided. This glass composition can have a higher rigidity and a higher modulus of elasticity than the conventional glasses and conventional aluminum alloy.

According to another preferred embodiment of the invention, chemical strengthening is easy as in the case of general soda-lime glasses, and a surface compression stress layer can be formed on the glass composition to a larger depth than on the general soda-lime glasses.

According to another embodiment of the invention, it is possible to produce a glass composition which has both a high rigidity and a high modulus of elasticity and is excellent in quality with respect to freedom from bubbles even without using a harmful clarifier such as As$_2$O$_3$ or Sb$_2$O$_3$. Because of the high quality with respect to freedom from bubbles, a higher yield is attained due to diminished bubble defects, whereby the production cost can be reduced.

According to the preferred embodiment of the invention, it is possible to produce a glass composition of even higher quality with respect to freedom from bubbles which has both a high rigidity and a high modulus of elasticity.

According to another preferred embodiment of the invention, it is possible to produce a high-rigidity high-modulus glass composition which has excellent surface smoothness and is advantageous also in cost.

According to still another embodiment of the invention, a glass substrate which has both a high rigidity and a high modulus of elasticity and is suitable for use as the substrate of an information recording medium can be obtained because of the use of the above glass composition.

According to preferred embodiment of the invention, a glass substrate which has a high fracture strength and is suitable for use as the substrate of an information recording medium can be obtained because of the use of the above glass composition.

According to another preferred embodiment of the invention, a recording medium employing the above glass substrate having both a high rigidity and a high modulus of elasticity and/or having a high fracture strength can be obtained. This recording medium can be rotated at a higher speed, bends less, and is free from resonant vibration. Hence, the gap between the magnetic disk head and the recording medium can be narrowed, making it possible to attain an increase in storage capacity and a reduction in access time. Therefore, the recording medium employing the glass composition is especially suitable for use in recording apparatuses of the high rotational speed type.

While the invention has been described in detail and with reference to specific embodiments thereof, it will be apparent to one skilled in the art that various changes and modifications can be made therein without departing from the spirit and scope thereof.

What is claimed is:

1. A substrate for information recording media which comprises a glass composition comprising the following basic components in terms of mol %:

40 to 65% $SiO_2$, 5 to 25% $Al_2O_3$, 2 to 20% $Li_2O$, 0 to 9% $Na_2O$, 0 to 10% $TiO_2$, 0 to 10% $ZrO_2$, 0 to 25% MgO, 0 to 25% CaO, and 0 to 10% SrO, provided that the content of RO (RO=MgO+CaO+SrO) is from 2 to 40% and the sum of $(Li_2O)/2$ and $Na_2O$ is from 1 to 10 mol %, said glass composition further containing from 0.1 to 3.0 mol % $SnO_2$ and from 0.004 to 0.1 mol % sulfur (S) in terms of the amount of $SO_3$ and having a rigidity as defined by (Young's modulus)/(specific gravity) of 30 $GPa \cdot g^{-1} \cdot cm^3$ or higher and a modulus of elasticity as represented by Young's modulus of 90 GPa or higher.

2. The substrate for information recording media as claimed in claim 1, which has undergone an ion exchange treatment in at least one molten salt containing ions of potassium, sodium, or both.

3. An information recording medium using the substrate as claimed in claim 1.

* * * * *